United States Defensive Publication [19] (H) [11] T965,004

Caunt [43] Dec. 6, 1977

[54] TREATMENT OF TRANSITION METAL COMPOUND AS COMPONENT FOR OLEFIN POLYMERIZATION CATALYST

[76] Inventor: Anthony David Caunt, 1 Templewood, Welwyn Garden City, Hertfordshire, England

[21] Appl. No.: 788,642

[22] Filed: Apr. 18, 1977

[30] Foreign Application Priority Data

May 7, 1976 United Kingdom ..... 18787/76

[51] Int. Cl.[2] ..... C08F 4/66; C08F 10/06

[52] U.S. Cl. ..... 526/128; 252/429 B; 526/139; 526/140; 526/351; 526/906

[57] ABSTRACT

A ground product suitable for use as a component of an olefine polymerization catalyst in which a solid compound of a transition metal, for example a titanium trichloride-containing product such as a $TiCl_3$—$AlCl_3$ composition, is ground with a minor portion of an organo-phosphorus or organo-silicon compound and is also contacted with a minor portion of a specified organo-sulfur compound. A minor portion includes from at least 0.01 and not more than 1 mole of the organic compound for each gram atom of transition metal which is present in the solid component of the transition metal. The organophosphorus compound can be a trihydrocarbyl phosphine or phosphine oxide, such as tributylphosphine or triphenylphosphine. The organosilicon compound can be an organo-silane, a siloxane or a compound containing at least one Si-N bond, for example a methylsiloxane compound.

Preferably, the sulfur-containing organic compound may be selected from sulphone compounds of the formula:

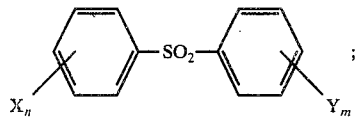

sulphonamide compounds of the formula:

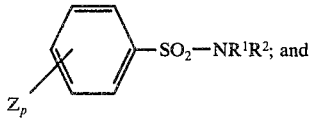

sulphide compounds of the formula:

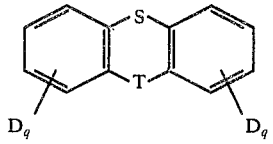

where X is a halogen atom, an alkyl, aryl, alkoxy, aryloxy, alkylthio or arylthio group, or a group —$NRR^1$, or two groups X can together form a saturated or unsaturated hydrocarbon ring; and Y is a halogen atom, an alkyl, aryl, alkoxy, aryloxy, alkylthio, or arylthio group, or a group —$NRR^1$, or two groups Y can together form a saturated or unsaturated hydrocarbon ring; or a group X and a group Y may be replaced by a link between the two phenyl groups attached to the —$SO_2$— group, the linkage being either direct or through a group —O—, —$CH_2$—, —NR—, —S—, or —CO—; Z is a halogen atom, an alkyl, aryl, alkoxy, aryloxy, alkylthio, or arylthio group, or a group —$NRR^1$, or two groups Z can together form a saturated or unsaturated hydrocarbon ring; D is a halogen atom, an alkyl, aryl, alkoxy, aryloxy, alkylthio or arylthio group, or a group —$NRR^1$; T is —S—, —O—, —$NR^1$—, or —CO—; R is a hydrogen atom or a hydrocarbyl group; $R^1$ is a hydrocarbyl group; $R^2$ is a hydrocarbyl group or it can be the group:

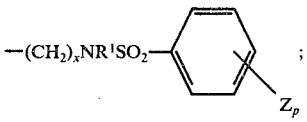

*n, m, p* and *q* are each, independently, an integer from 0 up to 5; and *x* is a positive integer.

The organo-sulfur compound is an aromatic sulphone, sulphonamide or heterocyclic sulfur compound, for example, diphenylsulphone, or phenoxathiin.

Contacting with the organo-sulfur compound can be effected by grinding for example in a ball mill, and all of the materials can be ground together. A metal halide such as titanium tetrachloride may also be present during the grinding step.

Olefine polymerization catalyst systems which include as a component thereof the transition metal/specific organo-sulfur compound are also disclosed.

14 Claims, No Sheets Drawing,

33 Pages Specification

The file of this unexamined application may be inspected and copies thereof may be purchased (849 O.G. 1221, Apr. 9, 1968).